(12) United States Patent
Brown et al.

(10) Patent No.: US 6,183,675 B1
(45) Date of Patent: Feb. 6, 2001

(54) MULTIPLE FIBER CHOPPERS FOR MOLDING PROCESSES

(75) Inventors: Bari W. Brown, Ann Arbor, MI (US); Steven P. Ireland, Delta, OH (US)

(73) Assignee: UT Automotive Dearborn, Inc., Dearborn, MI (US)

( * ) Notice: Under 35 U.S.C. 154(b), the term of this patent shall be extended for 0 days.

(21) Appl. No.: 09/227,112

(22) Filed: Jan. 8, 1999

(51) Int. Cl.[7] .................................................. B29C 31/10
(52) U.S. Cl. ........................ 264/115; 425/80.1; 425/82.1; 425/306
(58) Field of Search .................................. 264/517, 115; 425/80.1, 82.1, 289, 306

(56) References Cited

U.S. PATENT DOCUMENTS

| | | |
|---|---|---|
| 3,871,556 | 3/1975 | Breer et al. ............................ 222/132 |
| 4,405,681 | 9/1983 | McEvoy .............................. 428/309.9 |
| 4,568,003 | 2/1986 | Sperry et al. ......................... 222/145 |
| 5,164,197 | 11/1992 | Thary ................................... 425/4 R |
| 5,192,387 * | 3/1993 | Buckley ............................. 156/275.5 |
| 5,336,455 * | 8/1994 | Kelman ................................ 264/113 |
| 5,496,509 | 3/1996 | Yamamoto et al. .................. 264/129 |
| 5,503,782 * | 4/1996 | Dyrud et al. ............................. 264/6 |
| 5,512,715 | 4/1996 | Takewa et al. ....................... 181/295 |
| 5,643,507 * | 7/1997 | Berrigan et al. .......................... 264/6 |
| 5,727,357 | 3/1998 | Arumugasaamy et al. ......... 52/740.1 |
| 5,772,747 | 6/1998 | Turner et al. ........................... 106/33 |
| 5,843,365 * | 12/1998 | Pinson et al. ......................... 264/517 |
| 6,087,624 * | 7/2000 | Brown .............................. 219/121.72 |
| 6,983,676 * | 11/1999 | Brown .................................... 65/536 |

FOREIGN PATENT DOCUMENTS

| | | |
|---|---|---|
| 2015915 | 9/1979 | (GB) . |
| 01095013 | 4/1989 | (JP) . |
| WO9112944 | 9/1991 | (WO) . |
| PCT/US99/ 31305 | 12/1999 | (WO) . |

\* cited by examiner

*Primary Examiner*—Mary Lynn Theisen
(74) *Attorney, Agent, or Firm*—Emch, Schaffer, Schaub & Porcello Co., L.P.A.

(57) ABSTRACT

This process and apparatus use at least two chopper units. The fiber choppers may be laser beam choppers or existing standard chopper units. The process and apparatus for producing a fiber-reinforced molded composite comprises providing a moldable composition, a first fiber chopper providing chopped fibers to the apparatus from a first direction, a second fiber chopper providing chopped fibers to the apparatus from a second direction, wherein the first direction is different from the second direction and molding the moldable composition and fibers in the apparatus under heat and pressure to form the molded composite. One industrial application for these choppers is compression molding of interior trim panels for automobile doors. The choppers spray chopped glass fiber strands into a resin mixture. The glass and a polyol, isocyanate (—NCO) urethane resin mixture at the proper glass loading, distribution and pattern is fed to the mold.

14 Claims, 2 Drawing Sheets

MULTIPLE FIBER CHOPPERS FOR MOLDING PROCESSES

TECHNICAL FIELD

This invention relates to a process and apparatus for producing fiber-reinforced molded composites. More specifically, this invention relates to the use of multiple fiber choppers therein.

BACKGROUND ART

Fiber choppers are employed in conjunction with liquid resin spray dispensers to form a stream of resin-impregnated chopped fibers that are laid down on a substrate to form a glass fiber reinforced structure. As an elongated glass fiber strand passes between rollers, it is chopped into relatively short fiber segments and propelled by the action of the rollers out through a nozzle opening in the body of the chopper. The body and thus the nozzle are oriented so as to direct the stream of fibers into intersecting relationship with a stream of catalyzed resin, thus forming a stream of resin-impregnated chopped fibers. The stream of resin impregnated fibers is directed toward a substrate, and is allowed to impinge the substrate and form a layer of resin-impregnated fibers on the substrate. Typical products include auto body parts, underground storage tanks and boats.

One industrial application for a chopper is compression molding of interior trim panels for automobile doors. Vinyl panels first are vacuumed formed and transferred to the open mold of a compression mold. A chopper than sprays chopped glass fiber strands onto the vinyl preform. The glass is shaped onto the vinyl preform and followed with a polyol, isocyanate (—NCO) urethane resin mixture. The glass loading and glass spray pattern often cause problems. For example, ribs molded into the panel require high glass loadings of short fibers in the rib area. Edges of the panel require additional glass for added strength. Frequently, a single chopper cannot provide the proper glass loading, glass pattern, glass distribution and the like.

DISCLOSURE OF INVENTION

The process and apparatus of this invention is used with at least two chopper units. The fiber choppers may be laser beam choppers or existing standard chopper units. Our process and apparatus for producing a fiber-reinforced molded composite comprises providing a moldable composition to a molding apparatus, a first fiber chopper providing chopped fibers to the apparatus from a first direction, a second fiber chopper providing chopped fibers to the apparatus from a second direction, wherein the first direction is different from the second direction and molding the moldable composition and fibers in the apparatus under heat and pressure to form the molded composite.

Preferably, the first fiber chopper is on one side of the nozzle spraying resin mixture and the second chopper is on the opposite side of the nozzle, i.e. 180° apart. In another embodiment, a circular chopper surrounding the resin nozzle provides a veil of chopped fibers to the mold.

BEST MODE OF CARRYING OUT INVENTION

While our apparatus may be used in many applications, we designed the choppers for use in producing fiber reinforced polyurethane products. One industrial application for the laser chopper of this invention is compression molding of interior trim panels for automobile doors. Vinyl panels first are vacuumed formed and transferred to the open mold of a compression mold. The choppers than spray chopped glass fiber strands onto the vinyl preform. The chopped strands range in length from ½ inch to 6 inches. The glass is shaped onto the vinyl preform with a polyol, isocyanate (—NCO) urethane resin mixture. The resulting polyurethane contained a small amount of blowing agent to yield a polyurethane foam having a density of about 0.5 lbs/ft$^3$. The densities, however, may range from 0.25 to 2.0 lbs/ft$^3$. More specifically, a polyol such as polypropylene glycol is treated with a diisocyanate in the presence of some water and a catalyst (amines, tin soaps, organic tin compounds). As the polymer forms, the water reacts with the isocyanate groups to cause crosslinking and also produces carbon dioxide, which causes foaming. In other cases, trifluoromethane or similar volatile material may be used as blowing agents.

The glass loading in the polyurethane was about 15 to 18 weight percent. The polyurethane foam, however, may contain 10 to 60 weight percent glass fibers. Additional trim may be included in the mold, such as carpet panels. After compression molding, the part is ready for fastening to an automobile door. The glass loading and spray pattern can be tailored as desired with the use of the chopper embodiments of this invention. For example, ribs molded into the panel require high glass loadings of short fibers in the rib area. Edges of the panel require additional glass for added strength.

Weight percent as used herein is based on the weight of the fiber reinforced composite.

Figure 1:
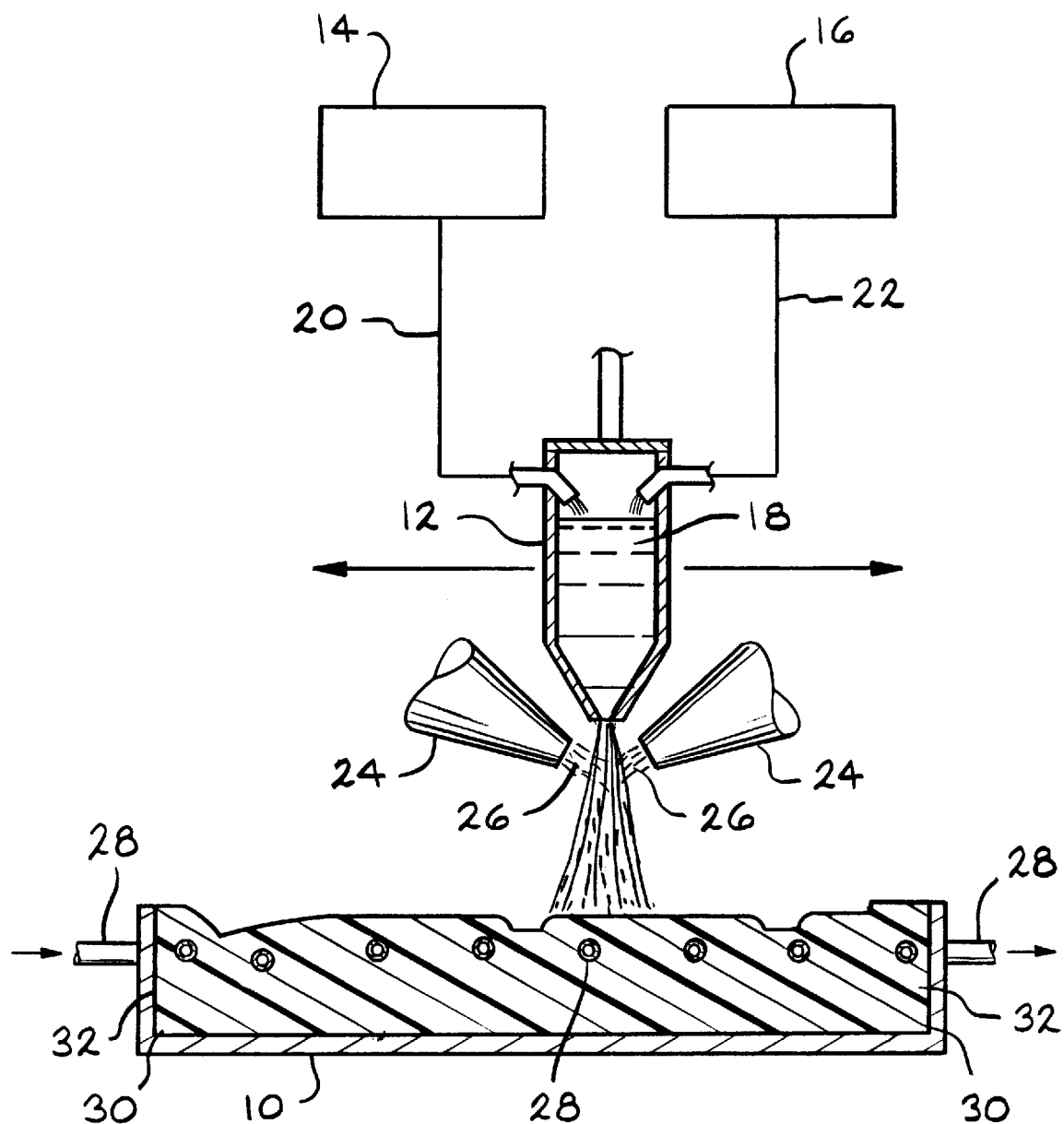
FIG. 1 is a perspective view of an apparatus combining two fiber choppers with a resin mixing head sandwiched therebetween.

FIG. 1 is a perspective view of a molding apparatus according to this invention. The apparatus includes mold 10 and mixing head 12. Containers 14 provides a polyol, to mixing head 12. Container 16 provides an isocyanate (—NCO) urethane resin to mixing head 12. Head 12 admixes the two components to form mixture 18. Feed lines 20 and 22 connect containers 14 and 16 to mixing head 12. Nozzles 24 provide chopped glass fibers 26 to composition 18 from glass fiber choppers (not shown).

Chopped glass fibers 26 and resin mixture 18 are admixed prior to depositing in mold 10. Heating conduit 28 provides heat to mold 10 and will be described in more detail in discussing FIG. 2. Fibers 26 and resin 18 form the molding composition. The molding composition may be moved about so that all of mold 10 is filled. This is especially useful in filling corners 30 and perimeter 32 of mold 10. As one could appreciate, any number of mold configurations may be used. One such heated, compression mold is supplied by Hennecke Corporation.

Figure 2:
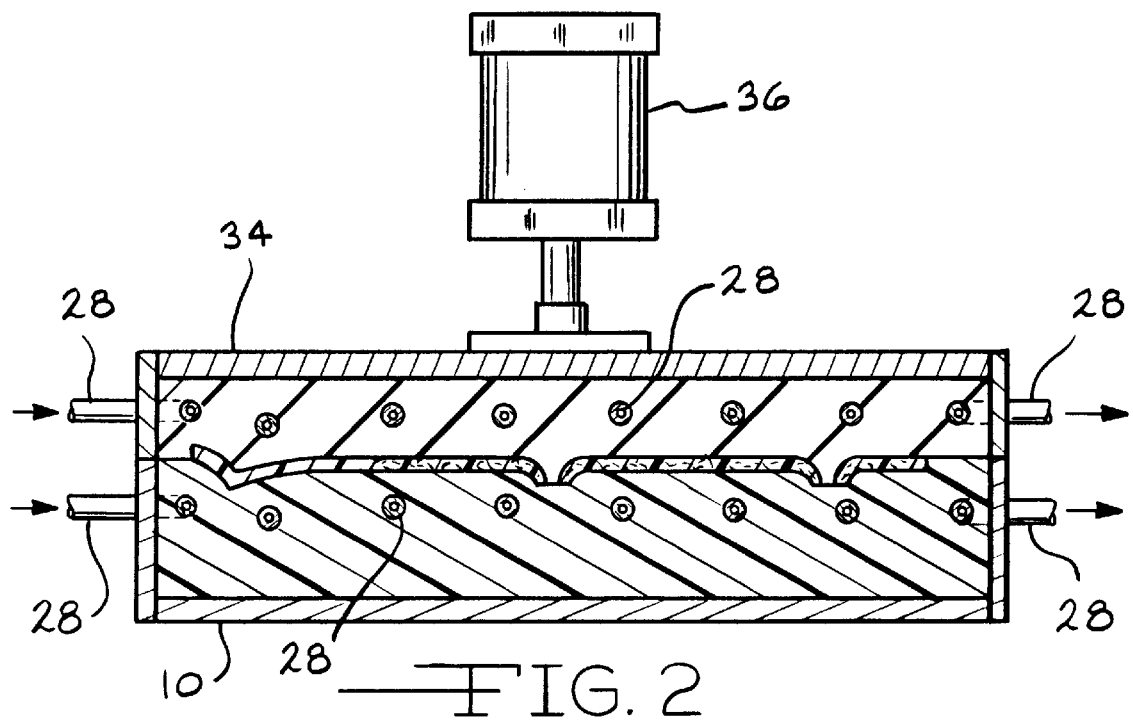
FIG. 2 is an enlarged fragmentary view showing another embodiment of FIG. 1 showing heat and compression being applied to the mold.

FIG. 2 is another view of the embodiment of FIG. 1, except that mold 10 is now provided with a close cover 34. Heating conduits 28 typically are serpentine conduits throughout mold 10 carrying a heating fluid such as hot oil or hot air. In the alternative, heating coils (not shown) may heat mold 10. Piston 36 provides compression to mold 10 through cover 34. Naturally, the fiber choppers and mixing head are lifted or swing out of the way, prior to piston 36 and cover 34 completing the molding process.

Figure 3:
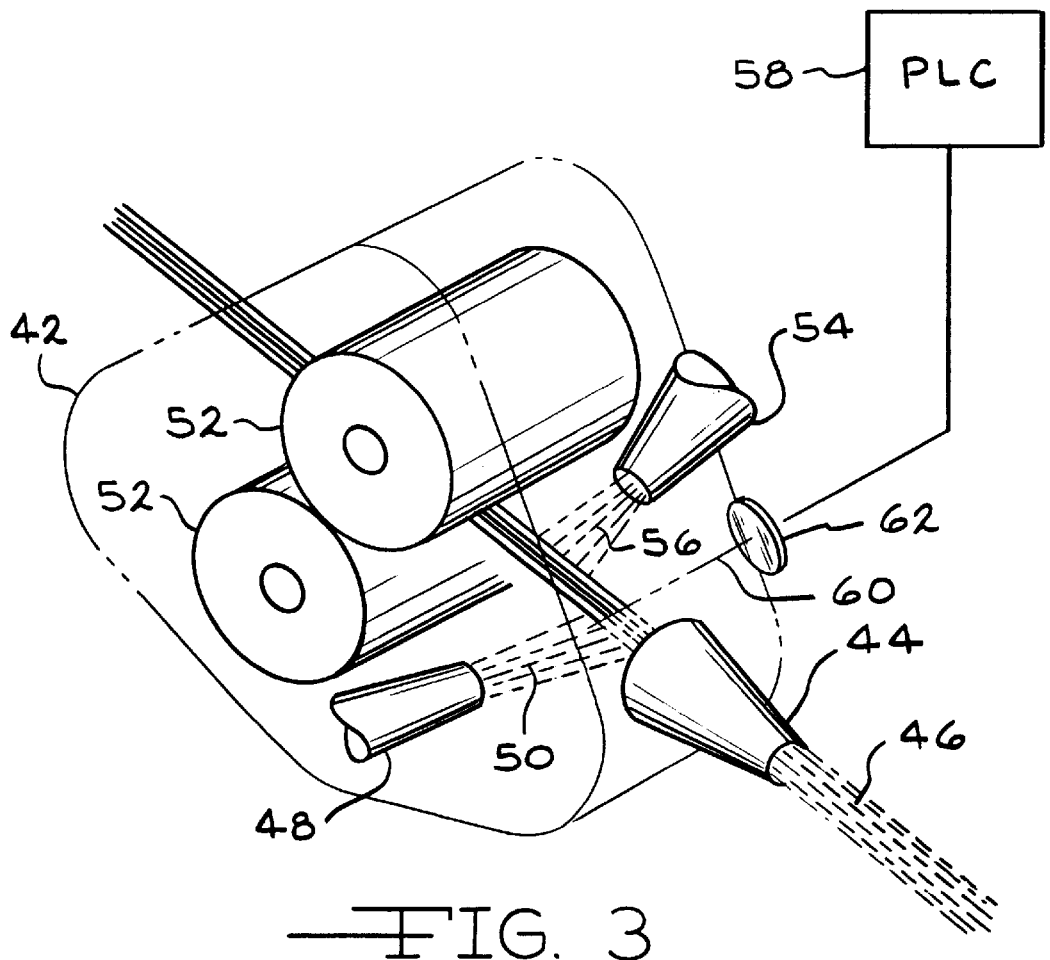
FIG. 3 is a perspective view of a laser beam fiber chopper.

FIG. 3 shows laser chopper 40. Chopper 40 has body 42 and nozzle 44. Nozzle 44 may have any configuration.

Nozzle 44 alone or with a deflector (not shown) causes all of the fiber segments issuing from nozzle 44 to form fiber stream 46. Nozzle 46 corresponds to nozzles 24 in FIG. 1.

FIG. 3 also shows fluid discharge block 48 discharging fluid (air) 50. Block 48 is used if necessary in the event that nip rollers 52 do not propel fibers 46 with sufficient force to discharge nozzle 44. In another embodiment, nozzle 54 and inert gas 56 may be used to propel fibers 28. In this event, block 48 is not needed. In still another embodiment, block 48 and nozzle 54 may not be needed. Faster cutting speeds may eliminate the need for these units. Programmable controller (PLC) 58 adjusts laser beam 60 to vary the chopped fiber length as desired during the chopping operation. Laser 62 also is shown.

U.S. patent applications Ser. No. 09/080,570, now U.S. Pat. No. 6,087,624, and Ser. No. 09/080,574, now U.S. Pat. No. 5,983,676, both filed on May 18, 1998 show fiber choppers in greater detail and are herein incorporated by reference.

The lasers used in these glass fiber choppers may vary widely. The device produces a beam of coherent or monochromatic light as a result of photon-stimulated emission. The beams have extremely high energy, as they consist of a single wave-length and frequency. The laser choppers easily produces long fiber reinforced urethane products such as interior panels and automobile doors.

The choppers used in the invention produce chopped fibers having a length ranging from ½ inch to 6 inches. The choppers can cut lengths as short as ¼ inch. The chopper also can cut fibers of varying length. With the aid of a programmable controller, the chopper can vary the length and amount of fibers during its operation. For example, when producing fibers for a molding operation of ribbed part, the chopper can produce short fibers for the ribs and long fibers for the body of the part. A programmable controller (PLC) easily controls each chopper to vary fiber lengths and amounts during chopping. Typically, the PLC and chopper are used with a robotic arm to produce the desired chopped fiber pattern.

The following demonstrates the usefulness of this invention. One chopper may be set to cut lengths of ½ inch. Another chopper may be set to chop lengths of 2 inches. Increasing the speed of either chopper increases the amount of fiber that chopper produces. Decreasing the speed does the opposite. Still a third chopper can yield a different length and different amount of fibers. Patterns for different fibers and different loads in the mold can be set. For example, corners 30 and perimeters 32 can be loaded with fiber. Amounts can range from 0 to 50 weight percent in different areas of the mold. One chopper may shut off and another have its speed increased.

While compression molding demonstrates the industrial uses for this invention, one can use the choppers to produce a wide variety of substrates with a wide variety of molding operations. The laser easily lends itself to use with, for example, resin injected molding (RIM). The choppers easily work with other fibers, such as polyamides (nylon), mineral fibers, aramid (Kevlar) fibers and the like.

While we show the fiber spray and resin spray coming together before spraying the substrate to be molded, these streams can be combined, separated or run independently of each other. The streams also can be mixed from concentric tubes with the fibers preferably being fed by the center tube. One also could first spray the fibers into a mold before pouring in the resin.

The fiber reinforced polyurethane composition of this invention typically is a composite of a polyurethane produced by the condensation reaction of at least one isocyanate component and at least one polyol component and a blend of fibers. Preferably, the fibers are chopped glass fibers.

The polyurethane of this invention varies widely. Generally, it is a thermoplastic polymer produced by the condensation reaction of a polyisocyanate and a hydroxyl-containing material, e.g., a polyol derived from propylene oxide or trichlorobutylene oxide. The basic polymer unit is formed as follows: $R_1NCO+R_2OH \rightarrow R_1NHCOOR_2$.

Glass fibers consist primarily of oxides of silicon, but oxides of other materials such as magnesium and aluminum are often present in relatively low concentrations. The glass fibers used in the preferred embodiment of this invention are substantially uniform in length within a range of about 1.2 cm to 4.4 cm, and preferably about 1.9 cm in length. These fibers typically have an average diameter of between 10 and 20 microns, and preferably about 15 microns. Glass fibers known as K, L and M filaments are readily available in the industry and fall within this range of dimensions. Glass fiber rovings for chopping are available from Owens Corning, Inc.

Although the now preferred embodiments of the invention have been set forth, it will be apparent to those skilled in the art that various changes and modifications may be made thereto without departing from the spirit and scope of the invention as set forth in the following claims.

We claim:

1. A process for producing a fiber-reinforced molded composite comprising the steps of:
   providing a moldable composition;
   a first fiber chopper providing chopped fibers to the moldable composition from a first direction;
   a second fiber chopper providing chopped fibers to the moldable composition from a second direction, wherein the first direction is different from the second direction;
   depositing the moldable composition and chopped fibers in a mold; and
   molding the moldable composition and fibers in the mold under heat and compression to form the molded composite.

2. A process according to claim 1 including the step of admixing the chopped fibers and moldable composition prior to the step of deposition them in the mold.

3. A process for providing a fiber-reinforced molded composite comprising the steps of:
   a nozzle providing a moldable composition;
   a first fiber chopper providing chopped fibers on one side of the nozzle;
   a second fiber chopper providing chopped fibers on a side of the nozzle opposite the first chopper;
   admixing the chopped fibers and moldable composition;
   depositing the admixture of the chopped fibers and moldable composition in a mold; and
   molding the moldable composition and fibers in the mold under heat and compression to form the molded composite.

4. A process for producing a fiber-reinforced molded composite comprising the steps of:
   a first nozzle providing a moldable composition;
   a multiplicity of fiber choppers providing chopped fibers surrounding the first nozzle;
   admixing the chopped fibers and moldable composition;
   depositing the admixture of the chopped fibers and moldable composition in a mold; and molding the moldable composition and chopped fibers in the mold under heat and compression to form the molded composite.

5. A process for producing a fiber-reinforced molded composite comprising the steps of:

a first nozzle providing a moldable composition;

a fiber chopper including a circular nozzle circumscribing the first nozzle providing a veil of chopper fibers to the moldable composition;

depositing the moldable composition and chopped fibers in a mold; and molding the moldable composition and chopped fibers in the mold under heat and compression to form the molded composite.

6. An apparatus for producing a fiber-reinforced molded composite comprising:

a mold including a means for heating and compressing the mold;

a means for providing a moldable composition to the a mold;

a first fiber chopper providing chopped fibers to the moldable composition from a first direction; and a second fiber chopper providing chopped fibers to the moldable composition from a second direction, wherein the first direction is different from the second direction.

7. An apparatus according to claim 6 wherein the first and second chopper are arranged to spray chopped fibers into the moldable composition prior to the moldable composition entering the mold.

8. An apparatus according to claim 6 wherein the first and second choppers are 180° apart.

9. An apparatus according to claim 6 wherein the means for spraying a moldable composition includes a mixing head, a container for providing a polyol to the mixing head and a container for providing an isocyanate to the mixing head.

10. An apparatus according to claim 6 wherein the first and second fiber choppers are laser beam choppers.

11. An apparatus according to claim 6 wherein the first and second chopper are knife or blade-style fiber choppers.

12. An apparatus for producing a fiber-reinforced molded composite comprising:

a mold including a means for heating and compressing the mold;

a nozzle for providing a moldable composition to the a mold;

a first fiber chopper on one side of the nozzle for providing chopped fibers to the moldable composition; and a second fiber chopper on a side of the nozzle opposite the first chopper for providing chopped fibers to the moldable composition.

13. An apparatus for producing a fiber-reinforced molded composite comprising the steps of:

a mold including a means for heating and compressing the mold;

a first nozzle for providing a moldable composition to the mold;

a multiplicity of fiber choppers surrounding the first nozzle for providing chopped fibers to the moldable composition.

14. An apparatus for producing a fiber-reinforced molded composite comprising;

a mold including a means for heating and compressing the mold; and a first nozzle for providing a moldable composition to the mold; and a fiber chopper including a circular nozzle circumscribing the first nozzle for providing a veil of chopper fibers to the moldable composition.

* * * * *

UNITED STATES PATENT AND TRADEMARK OFFICE
CERTIFICATE OF CORRECTION

PATENT NO. : 6,183,675 B1
DATED : February 6, 2001
INVENTOR(S) : Bari W. Brown and Steven P. Ireland It is certified that error appears in the above-identified patent and that said Letters Patent is hereby corrected as shown below:

On page 1 of the patent at Assignee, delete "UT Automotive Dearborn, Inc." and insert —Lear Automotive Dearborn, Inc.—

Signed and Sealed this

Fifth Day of June, 2001

*Attest:*

*Attesting Officer*

NICHOLAS P. GODICI
*Acting Director of the United States Patent and Trademark Office*